Dec. 19, 1961  S. CLAVÉ ET AL  3,013,471
PERISCOPE
Filed Jan. 15, 1960
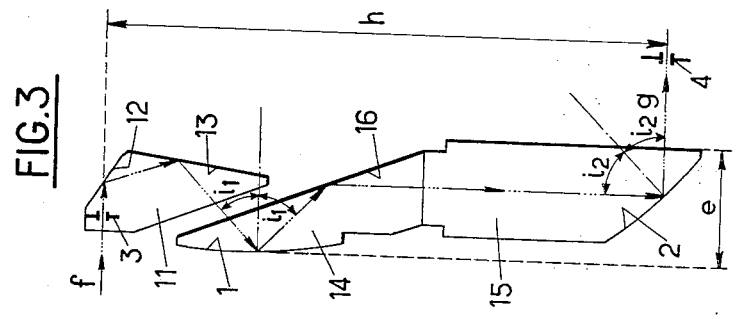
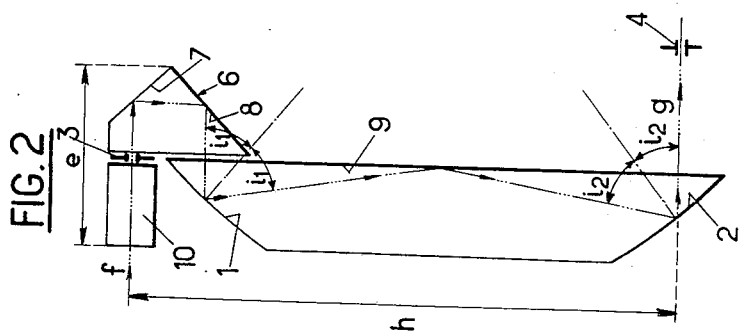
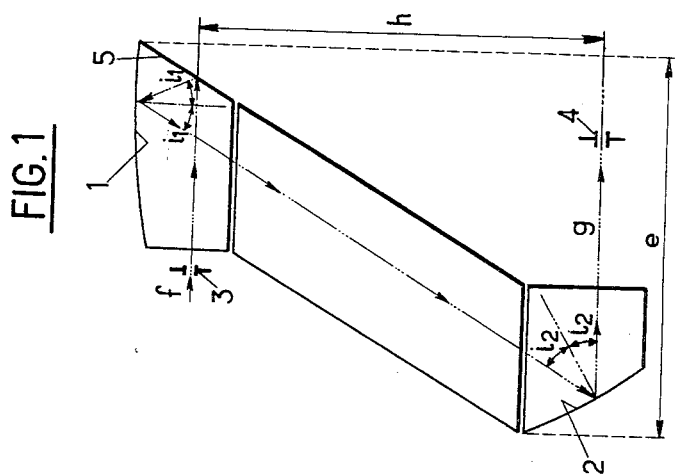
Inventors
SERGE CLAVÉ
MARCEL CLAVÉ
By Holcombe, Wetherill & Brisebois
Attorneys

3,013,471
PERISCOPE
Serge Clavé and Marcel Clavé, both of 9 Rue Olivier-Metra, Paris, France
Filed Jan. 15, 1960, Ser. No. 2,630
Claims priority, application France Jan. 21, 1959
10 Claims. (Cl. 88—68)

A periscope having a magnification of 1 may be constructed utilizing an afocal optical system comprising two cylindrical mirrors of the same power, associated with a plane mirror to restore an upright image.

Such an optical system is not entirely satisfactory, since when a large displacement between the axes of the entering and leaving light rays is provided, the instrument is very cumbersome due to its thickness. Moreover, in this arrangement, the windows are not satisfactorily spaced from the optical and mechanical elements. In particular, the observer is inconvenienced by the height of the mounting of the device. This latter defect is accentuated if, other things being equal, the air between the mirrors is replaced by a transparent element having an index of refraction $n>1$ in order to increase the apparent field.

The object of the present invention is to provide an afocal periscope which eliminates the aforementioned defects. The periscope according to the invention comprises two cylindrical mirrors of the same focal length, but is characterized by the fact that the image produced by the two cylindrical mirrors is reflected by three plane mirrors and not by a single plane mirror as in the aforesaid optical device.

This new optical combination, comprising three plane mirrors which may be positioned in different ways with respect to each other, permits a much less cumbersome arrangement for observing devices, with a greater displacement between the axes of the entering and departing bundles of light rays. It also permits the separation of the windows from the optical and mechanical elements. Moreover, the replacement of the air between the mirrors with a transparent body having an index of refraction $n>1$, is more easily accomplished, and permits one-piece constructions, in which the windows nevertheless remain adequately separated.

Several specific embodiments of the invention will now be described, with reference to the accompanying drawings, purely by way of example, it being understood that the invention lends itself to other variations as well.

On the drawing:

FIG. 1 is an axial section of a periscope comprising two cylindrical mirrors of the same power and a single plane surface mirror;

FIG. 2 shows an axial section of a device according to the invention in which the two cylindrical mirrors are positioned at an angle of 90° with respect to each other; and FIG. 3 is an axial section of another embodiment of the invention in which the two cylindrical mirrors are positioned at an angle of 135° with respect to each other.

Like reference characters denote like parts throughout the several views. The devices are of the one-piece type comprising a transparent body having an index of refraction $n=1.52$. The two cylindrical reflecting surfaces of each device are designated by 1 and 2 and may, to provide an example of measurements indicative of comparative spacing, have a radius of curvature of 250 mm.

Reference numerals 3 and 4 indicate the windows for the entering and departing light rays in each device; the axial ray of each entering bundle is represented by the arrowed line $f$ and the departing axial ray by the arrowed line $g$.

The device illustrated on FIG. 1 comprises only a single plane surface mirror 5. The angles of incidence of the axial ray on the surfaces 1 and 2 ($i_1$ and $i_2$ respectively) are both 30° so that the focal surfaces of the two mirrors may be practically coincident. This 30° angle permits a maximum height or interval $h$ between the entering and departing rays to be obtained, while also separating the windows 3 and 4 from the optical assembly.

The device of FIG. 2 comprises a prism 6 so positioned that the bundle of light rays is twice reflected, once by each of the plane surfaces 7 and 8, before reaching the first cylindrical surface 1.

The bundle of light rays reflected by 1 is again reflected by a third plane surface mirror 9 before reaching the second cylindrical surface 2. The device thus comprises, in combination with the cylindrical mirrors 1 and 2, three plane mirrors, 7, 8 and 9. The angles of incidence $i_1$ and $i_2$ on surfaces 1 and 2 are equal to each other and to 40°.

The device shown on FIG. 2 may comprise an auxiliary block 10 made of a transparent material serving as a protective screen. This block is made of a material having an index of refraction adapted to reduce the width of the bundle of rays entering through the window 3.

The device shown on FIG. 3 has a minimum thickness $e$, while retaining an optimum displacement between the axes $f$ and $g$ of the bundles of light rays passing through the windows 3 and 4 respectively. This last embodiment of the invention comprises two cylindrical mirrors 1 and 2 having the same radius, and a prism having two reflecting surfaces 12 and 13. The mirror is formed in a block 14 and the mirror 2 in a block 15. The mirrors 1 and 2, as well as the prism 11, are formed in a transparent material having an index of refraction $n>1$. The blocks 11 and 14 may be either separate or cemented together, whichever is easier to manufacture, and the mirrors 1 and 2 may be formed in a single block having a plane surface forming a mirror 16.

The axis of entrance of a bundle of light rays is always designated by $f$ and its axis of departure by $g$, and the windows through which it enters and leaves by 3 and 4 respectively.

The entering bundle of light rays is successively reflected by plane surfaces 12 and 13 of prism 11. This bundle impinges on the cylindrical mirror 1 at an angle of incidence $i_1=45°$, and is reflected to the plane surface mirror 16 which reflects it in turn to the second cylindrical mirror 2, against which it impinges at an angle of incidence $i_2$ equal to 45°.

The bundle of rays reflected by the mirror 2 leaves in a direction $g$ parallel to the entering bundle.

The angle of inclination of the mirror 16 relative to the direction of the bundle of light rays should be so calculated that the angles of reflection from the cylindrical mirrors 1 and 2 are equal, this angle of inclination being 22.5° in the case of FIG. 3.

It should be noted that the positioning of the intermediate plane surface mirror 16 gives the element 14 a prismatic shape provided with an acute dihedral angle, thus leaving space available for the prism 11 comprising the two other plane reflecting surfaces 12 and 13. This arrangement renders it unnecessary for the prism 11 to project beyond the blocks 14 and 15.

For all of the embodiments described, the space between the summits of curvature of the cylindrical reflecting surfaces 1 and 2, that is to say, the path travelled between these mirrors by an axial ray originating at infinity, is given by the formula $2t=R\cos i$, where $2t$ is the path of travel and $i$ the identical angle of incidence on the mirrors 1 and 2.

The windows 3 and 4 are of the same size in each of the described embodiments. Their distance (in a medium having the index of refraction $n=1.52$) which varies with the embodiments, is given by the formula $$t = \frac{R}{2} \cos i$$

where R is the radius of curvature of the cylindrical mirrors. The actual distance of these windows from the glass block is, of course, a function of the effective path of travel of the bundle of light rays lying partly in the material having an index of refraction $n$ and partly in air. In the examples described, the apparent field in a material having the index $n$ has been selected as 20°, which gives a field of observation of about 30° in air.

The following table permits a comparison between the interval or axial displacement $h$ between the axes $f$ and $g$ of the windows, on the one hand, and the distance (width) in a direction parallel to these axes in the embodiments hereinbefore described.

| Embodiment of | | Fig. 1 | Fig. 2 | Fig. 3 |
|---|---|---|---|---|
| | | Mm. | Mm. | Mm. |
| Axial displacement between $f$ and $g$ | $h=$ | 162 | 220 | 225 |
| Axial distance or width | $e=$ | 150 | 72 | 45 |

It will be seen from this table that the afocal device having a single plane surface mirror (FIG. 1) has the greatest width $e$ while its axial displacement $h$ is the smallest. FIG. 1 shows that the corresponding device has a less satisfactory positioning of the windows than that shown on FIGS. 2 and 3.

It is obvious that the blocks of transparent material provided with these combinations of cylindrical and plane surfaces may, as required to facilitate manufacture, be made in one or more pieces, and left separate or cemented together in any conventional manner.

It will of course be appreciated that the invention lends itself to a plurality of variations. For instance the cylindrical surfaces may have a circular section, or one following any geometric curve adapted to the intended purpose.

What is claimed is:

1. An afocal periscope comprising a first window, a first reflecting plane surface, a second reflecting plane surface, a first concave cylindrical reflecting surface, a third plane reflecting surface, a second concave cylindrical reflecting surface and a second window, the three plane surfaces and the generatrices of the two cylindrical surfaces being perpendicular to the same plane and said surfaces being so arranged that a bundle of light rays entering through said first window and parallel to said plane is successively reflected by said first plane surface to said second plane surface to said first cylindrical surface to said third plane surface and thence to said second cylindrical surface and departs through said second window.

2. A periscope according to claim 1 in which said first and second reflecting surfaces are two faces of a total-reflection prism.

3. A periscope according to claim 2, in which said first window is placed inside said total-reflection prism.

4. A periscope according to claim 1, in which said first and second reflecting plane surfaces are preceded by a block made of a transparent substance.

5. A periscope according to claim 4, in which said first window is placed between said block and said first reflecting plane surface.

6. A periscope according to claim 1, in which said third reflecting plane surface is nearer to said first cylindrical reflecting surface than to said second cylindrical reflecting surface.

7. A periscope according to claim 1, in which one of said cylindrical surfaces is the surface of a block made of a transparent substance.

8. A periscope according to claim 7, in which the other cylindrical surface is the surface of a block made of a transparent substance.

9. A periscope according to claim 1, in which said two cylindrical surfaces and said third plane surface are three surfaces of one block made of a transparent substance.

10. A periscope as claimed in claim 1 in which one of said cylindrical mirrors is positioned so that a plane tangent to its summit of curvature is at an angle with respect to the plane tangent to the summit of curvature of the other cylindrical mirror, and said third plane mirror is positioned at an angle relative to both cylindrical mirrors such that said bundle of light rays will impinge on said second cylindrical mirror at substantially the same angle at which it was reflected by said first mirror.

References Cited in the file of this patent
UNITED STATES PATENTS 2,867,151  Mandler _____ Jan. 6, 1959